United States Patent [19]
Bonne et al.

[11] Patent Number: 5,743,047
[45] Date of Patent: Apr. 28, 1998

[54] SEAL FOR SIMULTANEOUSLY SEALING A DOOR WINDOW PANE AND A DOOR OPENING ON A MOTOR VEHICLE

[75] Inventors: Andreas Bonne, Neukirch; Klaus Glagow, Wasserburg; Michael Haas, Kressbronn, all of Germany

[73] Assignee: Metzeler Automotive Profiles GmbH, Lindau/Bodensee, Germany

[21] Appl. No.: 338,680

[22] Filed: Nov. 14, 1994

[30] Foreign Application Priority Data

Nov. 15, 1993 [DE] Germany ............... 43 39 033.1

[51] Int. Cl.$^6$ ............................................... E06B 7/16
[52] U.S. Cl. .............. 49/490.1; 49/475.1; 49/495.1; 49/441
[58] Field of Search ................ 49/490.1, 495.1, 49/475.1, 440, 441, 506; 29/450, 451, 453

[56] References Cited

U.S. PATENT DOCUMENTS

| | | | |
|---|---|---|---|
| 3,108,338 | 10/1963 | Stec et al. | 49/490.1 X |
| 4,220,681 | 9/1980 | Narita | 49/490.1 X |
| 4,656,784 | 4/1987 | Brachmann | 49/490.1 |
| 5,024,480 | 6/1991 | Petrelli | 49/490.1 X |
| 5,027,556 | 7/1991 | Ginster | 49/441 |
| 5,038,521 | 8/1991 | Andrzejewski et al. | 49/495.1 X |
| 5,123,693 | 6/1992 | Karashima et al. | 49/490.1 X |
| 5,342,107 | 8/1994 | Saji et al. | 49/490.1 X |

FOREIGN PATENT DOCUMENTS 64024  4/1985  Japan ......................... 49/475.1

*Primary Examiner*—Jerry Redman
*Attorney, Agent, or Firm*—Cumpston & Shaw

[57] ABSTRACT

An arrangement for simultaneously sealing a door window pane (12) and the roof area (35) on a door of a motor vehicle, having a single-piece profile (A) of elastomer material with a fastening section (1) which slips on to the door flange (10), a sealing section (3) for the door window pane (12) and a sealing element (2) for the area between the upper edge of the door and the roof (35). For the purpose of providing a complete solution for the supply and mounting of this arrangement as a single piece, provision is made, according to the invention, that the entire outer face of the U-shaped fastening section (1), which slips on to a projecting door flange (10), is covered by an aluminium strip (3) which has two webs (16, 17) which project vertically inwards and run parallel to the projecting door flange (10) and clip into two parallel outwardly open slots (18, 19) in the arms (5, 6) of the U-shaped fastening section (1).

24 Claims, 3 Drawing Sheets

SEAL FOR SIMULTANEOUSLY SEALING A DOOR WINDOW PANE AND A DOOR OPENING ON A MOTOR VEHICLE

BACKGROUND OF THE INVENTION

The invention concerns an arrangement for simultaneously sealing a door window pane and the door opening on a motor vehicle by means of a single-piece profile, made from an elastomer material, with a fastening section which slips on to the door flange, a sealing section for the door window pane and a sealing element for the door opening, between the upper edge of the door and the roof.

DESCRIPTION OF THE RELATED ART

An arrangement of this type is known from EP 0 182 319 B1. In that arrangement, the single-piece profile has two parallel U-shaped recesses which clamp on to two parallel projecting metal edges of the door frame. This profile design necessitates the provision of a continuous reinforcement of a complex cross-sectional form within the profile and, moreover, fixing the profile to the door flange by means of additional fastenings.

By contrast, the object underlying the present invention is to create a single-piece arrangement of this type for sealing the door window pane and the door opening which can be supplied to the vehicle manufacturer as a finished component and can be mounted on the door of the vehicle without additional devices.

SUMMARY OF THE INVENTION

This object is achieved, according to the invention, in that the entire outer face of the U-shaped fastening section, which slips on to a projecting door flange and possesses a laterally projecting sealing lip section for the outside of the door window pane, is covered with a strip of rigid material which has two webs, projecting inwards at an approximate right angle, which run approximately parallel to the projecting door flange and clip into two outwardly open slots in the arms of the U-shaped fastening section.

Such a strip, of appropriate design, which can be made from aluminium or plastics, covers the outwardly exposed rubber sections of the profile, resulting in an improved appearance, in addition to which this strip effectively stabilizes and reinforces the profile and, when slipped on to the door flange, reliably clamps the fastening section in position.

It is expedient, for the purpose of retaining the imposed profile, that a snap-in lip projects from an inner side wall of the U-shaped fastening section covering the door flange, this snap-in lip engaging in a contraction at the free end of the door flange.

This contraction can also be formed by a bordered edge of the door flange.

With regard to the design of the rest of the profile, the inner part of the window guide section can be moulded on to the outer edge of the arm of the U-shaped fastening section next to the window pane, the inner part of the window guide section being composed of a hard rubber web, running parallel to the window pane and supported on another door plate section, and of soft rubber sealing lips on both the upper and lower ends which are inclined obliquely towards each other and bear against the inside of the closed window pane.

It is expedient, with regard to the sealing against the roof, that a soft rubber sealing lip, which serves to provide a seal against the roof, is extruded in the plane of the aluminium strip on to the arm of the U-shaped fastening section which is next to the roof, the base of the sealing lip engaging by means of a beaded tongue in an undercut groove on the side of a web of the aluminium strip.

Alternatively, it is also possible for a sealing lip, serving as a seal against the edge of the roof, to be extruded in the plane of the strip on to the arm of the U-shaped fastening section which is next to the roof, with a snap-in knob projecting from the strip engaging in the base of the sealing lip.

With respect to the material used, it is advantageous if the U-shaped fastening section with the laterally projecting retaining section for the extruded-on sealing lip is composed of hard rubber.

Moreover, in a further development of the invention, it is also possible for the lower end of the inner part of the window guide section to have an anti-jamming device, extending parallel to the window pane, in the form of an attached hollow profile with conductive rubber sections on opposite sides of the hollow profile.

A further possible design of the profile is that in which the strip of rigid material is slipped directly on to the projecting door flange, its upper web possessing a receiving groove for a sealing lip against the edge of the roof, and its lower web section, which has two vertical tongues, enclosing the actual window guide profile of elastomer material.

In this case, the sealing lip can be formed as a hollow chamber profile with a pine-tree base for locking into the receiving groove.

It is expedient, for secure mounting of the window guide profile, for the outer section of the strip to have a tongue, projecting inwards, which engages in a corresponding recess of the window guide profile.

Provision is made, according to the invention, that in a method for assembling and mounting an arrangement of this type, the profile consisting of the sealing section against the roof, the U-shaped fastening section and the window guide section is extruded as one piece from an elastomer with sections of differing hardnesses, the strip of rigid material with the two projecting webs being clipped into the profile and the profile, assembled thus, being slipped on to the door flange so that the snap-in lip locks into the door flange.

The construction and functioning of an embodiment example according to the invention are described in greater detail with reference to a schematic drawing.

DESCRIPTION OF THE PREFERRED EMBODIMENTS

Figure 1:
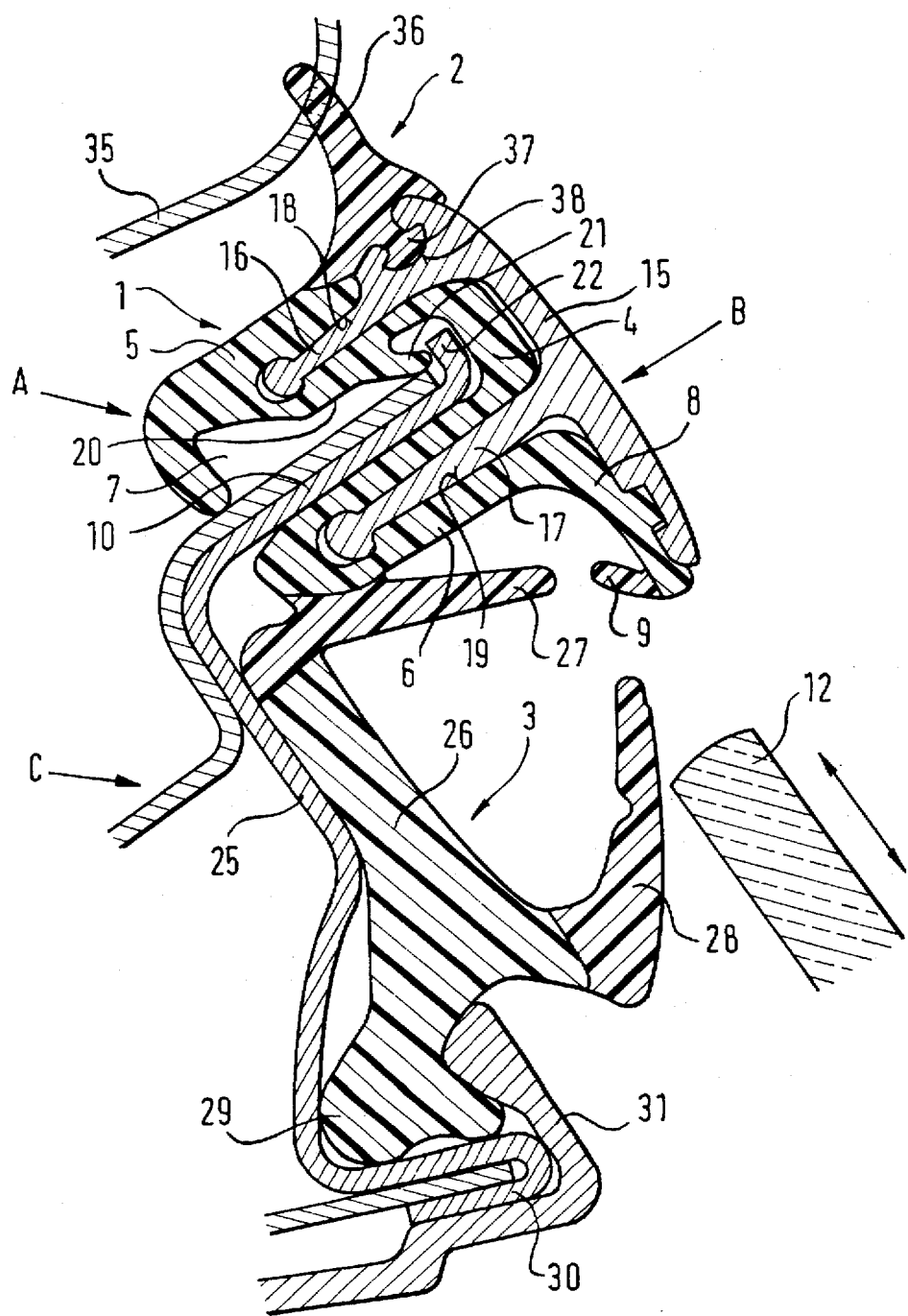
FIG. 1 shows a complete arrangement in the assembled state.

As shown by FIG. 1, the complete assembled arrangement comprises the actual elastomer profile A and the rigid strip B, which are slipped on to the door plate C.

The elastomer profile A firstly has a U-shaped clamping section 1 of hard rubber, indicated by the oblique downward hatching, which comprises the two arms 5 and 6, projecting from the base 4, which define a gap 7 for receiving the door flange 10. Also projecting laterally from the upper end of the arm 6 there is a retaining section 8 for an inwardly projecting sealing lip 9 which bears against the outside of the closed window pane 12.

The outside of this U-shaped clamping section 1 is covered by a rigid strip B, which can be composed of aluminium or plastics, and which has a flat base section 15 and two webs 16 and 17, projecting vertically inwards, which run parallel to the projecting door flange 10 and clip into two parallel outwardly open slots 18 and 19 in the arms 5 and 6 of the U-shaped fastening section 1.

Also projecting obliquely upwards from an inner side wall 20 of the slot 7 there is a snap-in lip 21 which grips behind a bordered edge 22 on the free end of the door flange 10.

Extruded on to the outer edge of the arm 6 of the U-shaped fastening section 1 which is next to the window pane is the inner part of the window guide section 3. This window guide section 3 consists of a hard rubber web 26, extending along the door plate section 25 and parallel to the window pane 12, on to the upper end of which there is extruded an inwardly projecting sealing lip 27 and on to the lower end of which there is extruded a further sealing lip 28—both of soft rubber—which bear against the inside of the window pane 12 when it is closed. The lower end of the web 26 also has a lateral foot 29 which is encompassed by a further door flange 30 and is clamped by a plastics clamping profile 31.

The sealing section 2 serving as a seal against the roof 35 and consisting of a soft rubber sealing lip 36 extruded on to the arm 5 is provided in the plane of the strip 15, on the arm 5 of the U-shaped fastening section which is next to the roof. The base section of this sealing lip 36 has a beaded tongue 37 which can engage in an undercut groove 38 in the side of the web 16 of the strip 15.

Figure 2:
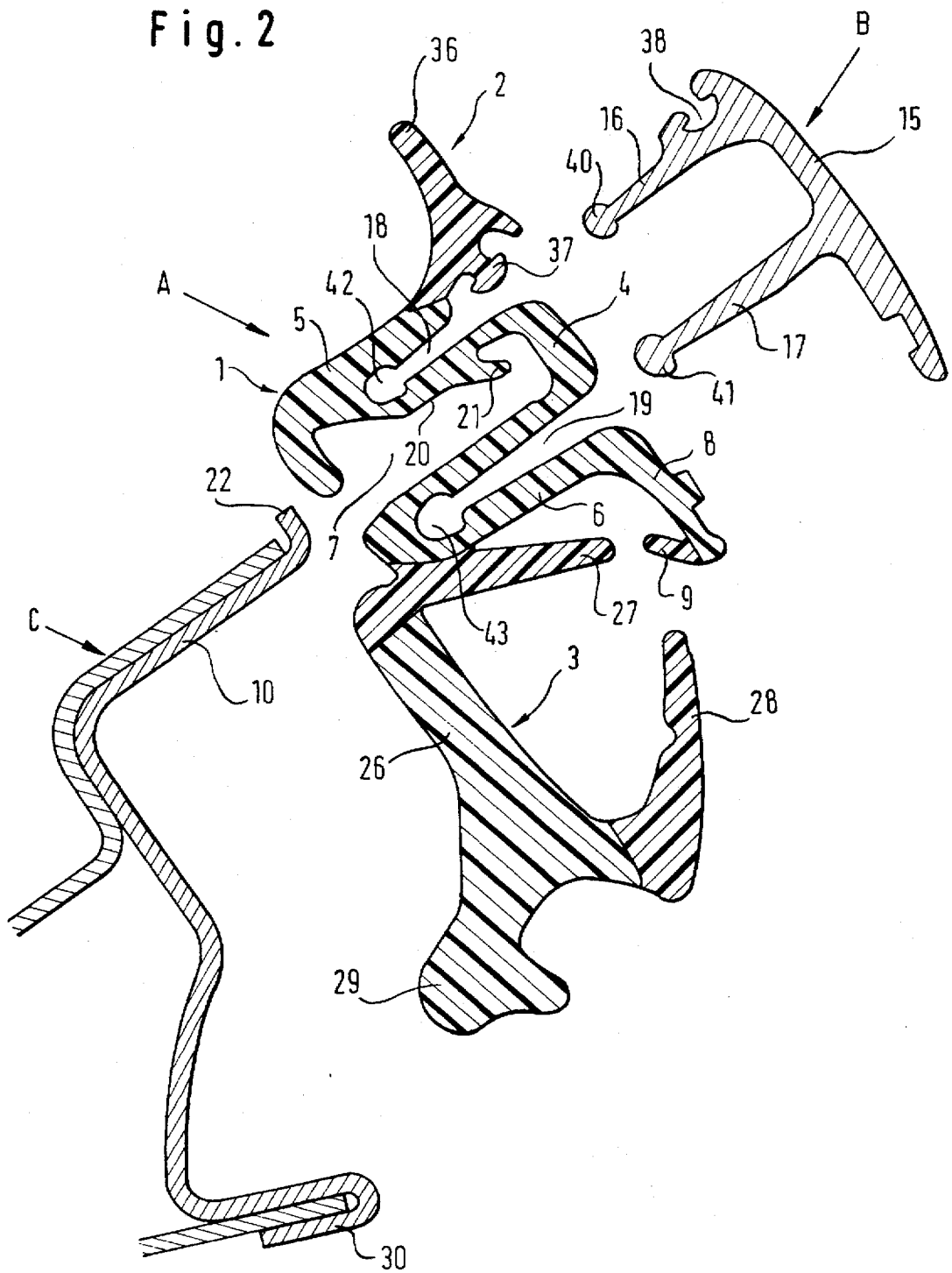
FIG. 2 shows this complete arrangement in the disassembled state, with a sealing profile, rigid strip and door plate.

FIG. 2 again shows the complete arrangement, in the disassembled state, with the profile A, the strip B and the door plate C.

Profile A shows clearly the U-shaped clamping section 1, the sealing section 2 against the roof and the window guide section 3. This profile A has rubbers of differing hardnesses, indicated accordingly by the hatched lines, in which the areas indicated by oblique downward hatching are composed of hard rubber and those indicated by oblique upward hatching are composed of soft rubber.

When the webs 16 and 17 of the aluminium strip B are inserted into the corresponding slots 18 and 19 of the arms 5 and 6 of the clamping section 1 and their enlarged ends 40 and 41 lock into the recesses 42 and 43, the exposed exterior of the rubber profile is fully covered, in the area of the fastening section 1 and the retaining section 8, by the base section 15 of the aluminium strip B. The webs 16 and 17 also serve to reinforce and complete the profile A and simplify mounting.

The profile A, together with the attached aluminium strip B, is then slipped on to the flange 10 of the door plate C until the snap-in lip 21 engages behind the bordered edge 22 of the flange 10. The lower foot 29 of the window guide section 3 is then locked in position by the plastics profile 31—as shown by FIG. 1—and clamped against the flange 30.

Figure 3:
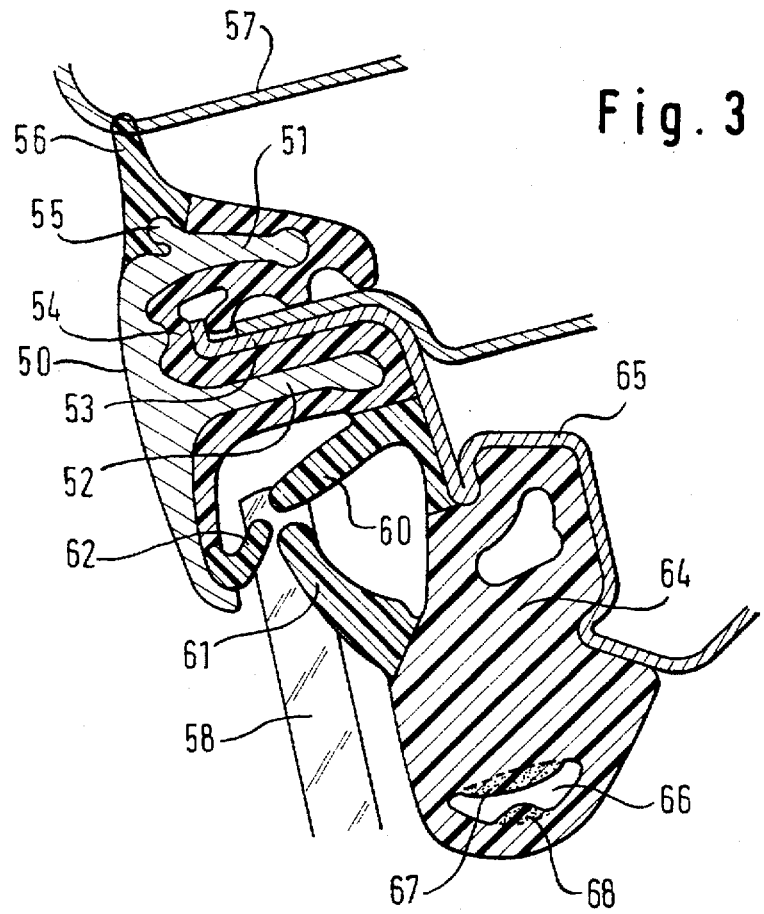
FIG. 3 shows a cross-section through a modified design of such a profile.

The embodiment example according to FIG. 3 also has a rigid exterior strip 50 of aluminium or plastics, the two projecting webs 51 and 52 of which engage in the fastening section 54 of the profile enclosing the projecting door flange 53. The upper web 51 of the strip 50 has an upwardly projecting snap-in knob 55 which engages in a corresponding recess in the sealing lip 56 sealing the gap between the door and the edge of the roof 57.

The window guide section enclosed by the lower section of the strip 50 and possessing the three sealing lips 60, 61 and 62 which project towards the window pane 58 is retained, on the inside, by a profile section 64 which is mounted in a corresponding undercut 65 in the door plate.

Attached to the lower end of this profile section 64, parallel to the window pane 58 and serving as an anti-jamming device, there is a hollow profile 66 with two sections 67 and 68 of conductive rubber, on opposite sites, which come into contact when the hollow profile 66 is compressed and emit a stop or reverse signal to an associated electrical window winder.

Figure 4:
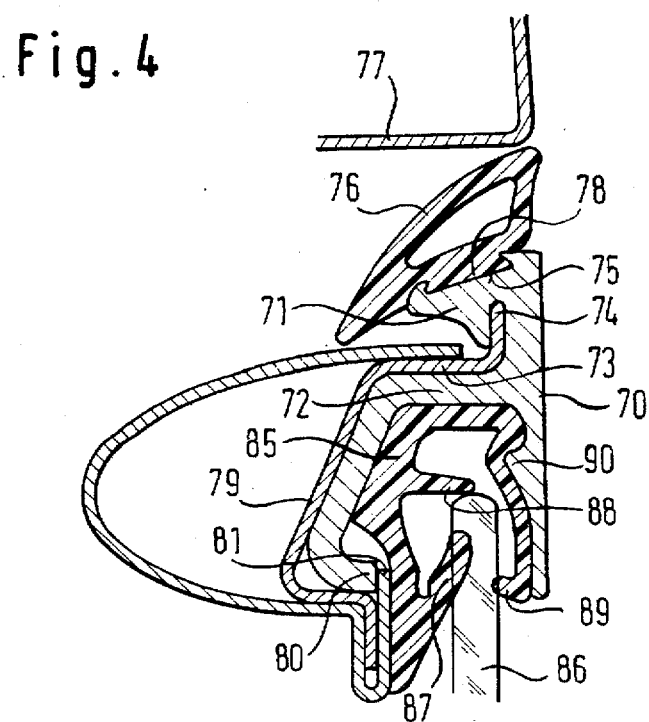
FIG. 4 show a further variant of such an arrangement.

The embodiment example according to FIG. 4 is of a somewhat different construction, although based on the same fundamental principal. In this case, the rigid strip 70 of aluminium or plastics with its backwardly projecting webs 71 and 72 is mounted directly on to the projecting door flange 73, or a bent edge 74.

The upper web 71 has an undercut groove 75, into which is inserted the sealing profile 76, in the form of a hollow profile, which seals the gap between the door and the roof edge 77 with a pine-tree base 78. It is expedient for this sealing profile 76 to be composed of cellular rubber.

The lower backwardly projecting web 72 is bent downwards along the door plate 79, its free end 80 being clamped against a tongue 81 of the door plate 79. In this way, the lower section of the web 72 and the lower section of the strip 70 form an approximate downwardly open U into which is inserted the actual window guide profile 85 with the three sealing lips 87, 88 and 89 which project inwards towards the window pane 86.

To improve the clamping action, the strip 70 possesses an inwardly projecting tongue 90 which engages in a corresponding indentation in the window guide profile 85, thereby preventing the strip from falling out.

The complete arrangement is therefore a stable arrangement for simultaneously sealing a door window pane and the door opening against the roof, which is supplied in the assembled state and can be mounted on the door by a simple clip-on action without additional devices. Moreover, the absence of a fixed connection between the aluminium or plastics strip and the actual rubber profile, the strip being only clipped on, means that both parts can be easily separated and recycled.

We claim:

1. A seal for simultaneously sealing a door window pane and a door opening on a motor vehicle comprising:
    a single-piece profile, made from an elastomer material, including a U-shaped fastening section having arms and two outwardly open slots, adapted to slip onto a door flange, a laterally projecting sealing lip section adapted to engage an outside surface of a door window pane and a sealing element adapted for sealing between an upper edge of the door and a roof, a strip of rigid material, having two webs which project at approximately right angles from the strip and engage the outwardly open slots for covering an entire outer face of the U-shaped fastening section.

2. A seal according to claim 1, in which the strip of rigid material comprises aluminum.

3. Method for assembling and mounting a seal according to claim 2 comprising extruding a profile, including the sealing element, and the U-shaped fastening section as one piece from art elastomer with sections of differing hardnesses; clipping the strip of rigid material with the two projecting webs into the profile and the profile, onto a door flange.

4. A seal according to claim 1, in which the strip of rigid material comprises rigid plastic.

5. Method for assembling and mounting a seal according to claim 4 comprising extruding a profile, including the sealing element, and the U-shaped fastening section, as one piece from art elastomer with sections of differing hardnesses; clipping the strip of rigid material with the two projecting webs into the profile, and the profile, onto a door flange.

6. A seal according to claim 1, comprising a snap-in lip projecting from an inner side wall of the U-shaped fastening section, the snap-in lip adapted to engage a contraction at a free end of a door flange.

7. Method for assembling and mounting a seal according to claim 6 comprising extruding the profile, including the sealing element and the U-shaped fastening section, as one piece from an elastomer with sections of differing hardnesses; clipping the strip of rigid material with the two projecting webs into the profile, and the profile, onto the door flange so that the snap-in lip locks behind the edge of the door flange.

8. A seal according to claim 1, comprising a window guide section extruded on an outer edge of one arm of the U-shaped fastening section the window guide section comprising a hard rubber web adapted to run parallel to a window pane and adapted to be supported on another door plate section; and soft rubber sealing lips on both an upper and a lower end of the window guide section which are inclined obliquely towards each other and are adapted to bear against an inside surface of a window pane when closed.

9. A seal according to claim 8, in which the lower end of an inner part of the window guide section comprises a hollow profile with conductive rubber sections on opposite sides of the hollow profile.

10. Method for assembling and mounting a seal according to claim 9 comprising extruding the profile, including the sealing element the U-shaped fastening section and the window guide section, as one piece from an elastomer with sections of differing hardnesses; clipping the strip of rigid material with the two projecting webs into the profile, and the profile, onto the door flange.

11. Method for assembling and mounting a seal according to claim 8 comprising extruding the profile, including the sealing element the U-shaped fastening section and the window guide section, as one piece from an elastomer with sections of differing hardnesses; clipping the strip of rigid material with the two projecting webs into the profile, and the profile, onto the door flange.

12. A seal according to claim 1, comprising a sealing lip extruded in a plane of the strip onto an arm of the U-shaped fastening section, and a beaded tongue on the sealing lip for engaging in an undercut groove on a side of a web of the strip.

13. Method for assembling and mounting a seal according to claim 12 comprising extruding the profile, including the sealing element the U-shaped fastening section and a window guide section, as one piece from an elastomer with sections of differing hardnesses; clipping the strip of rigid material with the two projecting webs into the profile, and the profile, onto the door flange.

14. A seal according to claim 1, comprising a sealing lip extruded in a plane of the strip on an arm of the U-shaped fastening section, and a snap-in knob projecting from the strip for engaging in a base section of the sealing lip.

15. Method for assembling and mounting a seal according to claim 14 comprising extruding the profile, including the sealing element the U-shaped fastening section and a window guide section, as one piece from an elastomer with sections of differing hardnesses; clipping the strip of rigid material with the two projecting webs into the profile, and the profile, onto the door flange.

16. A seal according to claim 1, in which the U-shaped fastening section comprises a hard rubber laterally projecting retaining section and the sealing lip comprises soft rubber.

17. Method for assembling and mounting a seal; according to claim 16 comprising extruding the profile, including the sealing element the U-shaped fastening section and a window guide section, as one piece from an elastomer with sections of differing hardnesses; clipping the strip of rigid material with the two projecting webs into the profile, and the profile, onto the door flange.

18. A seal according to claim 1, in which one web comprises a receiving groove and the other web comprises two vertical tongues.

19. A seal according to claim 18, in which the sealing lip comprises a hollow chamber profile with a pine-tree base for locking into the receiving groove.

20. Method for assembling and mounting a seal according to claim 19 comprising extruding the profile, including the sealing element the U-shaped fastening section and a window guide section, as one piece from an elastomer with sections of differing hardnesses; clipping the strip of rigid material with the two projecting webs into the profile, and the profile, onto the door flange.

21. A seal according to claim 18, comprising an outer strip section including a tongue, projecting inwards, which engages in a corresponding recess of the profile.

22. Method for assembling and mounting a seal according to claim 21 comprising extruding the profile, the sealing element the U-shaped fastening section and a window guide section, as one piece from an elastomer with sections of differing hardnesses; clipping the strip of rigid material with the two projecting webs into the profile, and the profile, onto the door flange.

23. Method for assembling and mounting a seal according to claim 18 comprising extruding the profile, including the sealing element the U-shaped fastening section and a window guide section, as one piece from an elastomer with sections of differing hardnesses; clipping the strip of rigid material with the two projecting webs into the profile, and the profile, onto the door flange.

24. Method for assembling and mounting a seal according to claim 1 comprising extruding the profile, including the sealing element, and the U-shaped fastening section, as one piece from an elastomer with sections of differing hardnesses; clipping the strip of rigid material with the two projecting webs into the profile and slipping the profile onto a door flange.

* * * * *